US012640615B2

(12) United States Patent     (10) Patent No.:   US 12,640,615 B2

Kawai        (45) Date of Patent:     May 26, 2026

(54) OUTBOARD ENGINE

(71) Applicant: HONDA MOTOR CO., LTD., Tokyo (JP)

(72) Inventor: Norikazu Kawai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 502 days.

(21) Appl. No.: 18/169,945

(22) Filed: Feb. 16, 2023

(65) Prior Publication Data

US 2023/0318395 A1     Oct. 5, 2023

(30) Foreign Application Priority Data

Feb. 28, 2022    (JP) ................................. 2022-030010

(51) Int. Cl.

| | |
|---|---|
| *H02K 5/20* | (2006.01) |
| *B63H 20/14* | (2006.01) |
| *B63H 20/28* | (2006.01) |
| *B63H 20/32* | (2006.01) |
| *B63H 20/34* | (2006.01) |
| *H02K 7/116* | (2006.01) |
| *H02K 9/19* | (2006.01) |
| *H02K 11/33* | (2016.01) |

(52) U.S. Cl.

CPC ............. *H02K 5/203* (2021.01); *B63H 20/14* (2013.01); *B63H 20/28* (2013.01); *B63H 20/34* (2013.01); *H02K 7/116* (2013.01); *H02K 9/19* (2013.01); *H02K 11/33* (2016.01); *B63H 2020/323* (2013.01)

(58) Field of Classification Search

CPC ........ H02K 5/203; H02K 11/33; H02K 7/116; H02K 9/19; B63H 20/14; B63H 20/28; B63H 20/34; B63H 2020/323

See application file for complete search history.

(56) References Cited

U.S. PATENT DOCUMENTS

| | | | |
|---|---|---|---|
| 10,364,010 B2 * | 7/2019 | Coller | .................... B63H 20/10 |
| 10,533,484 B2 | 1/2020 | Coller et al. | |
| 2011/0195620 A1 * | 8/2011 | Davis | ..................... B63H 20/14 |
| | | | 440/75 |
| 2019/0271255 A1 * | 9/2019 | Coller | ................... B63H 20/28 |

OTHER PUBLICATIONS

German Office Action dated Oct. 24, 2025 issued in corresponding German application No. 10 2023 103 495.2; English translation included (8 pages).

* cited by examiner

*Primary Examiner* — Stephen P Avila

(74) *Attorney, Agent, or Firm* — Rankin, Hill & Clark LLP

(57) ABSTRACT

There are included: a motor contained in a top cover; a vertical shaft that is rotationally driven by the motor, the vertical shaft being contained in an extension casing; and a propeller that is rotationally driven by the vertical shaft, the propeller being provided at a gear casing. A heat exchanging member is provided that is positioned below an anticavitation plate and above a propeller shaft that rotationally drives the propeller, and inside the heat exchanging member, a cooling oil channel member is provided that cooling oil for cooling the motor flows through.

18 Claims, 8 Drawing Sheets

FIG.3

OUTBOARD ENGINE

INCORPORATION BY REFERENCE

The present application claims priority under 35 U.S.C. § 119 to Japanese Patent Application No. 2022-030010 filed on Feb. 28, 2022. The content of the application is incorporated herein by reference in its entirety.

BACKGROUND OF THE INVENTION

Field of the Invention

The present invention relates to an outboard engine, and specifically, relates to an outboard engine driven by an electric motor.

Description of the Related Art

There has been conventionally disclosed an outboard engine including, for cooling the outboard engine, a heat exchanging part that cools a coolant such as cooling oil through underwater heat exchange (for example, U.S. patent Ser. No. 10/533,484).

SUMMARY OF THE INVENTION

The conventional technology however has a problem that since the heat exchanging part for heat exchange of the coolant is installed behind the outboard engine, it is affected by heat generated by the outboard engine and the coolant cannot be efficiently cooled.

The present invention is devised in view of the aforementioned circumstances, and an object thereof is to provide an outboard engine capable of efficiently cooling cooling oil for a motor.

In order to achieve the aforementioned object, there is provided an outboard engine according to an aspect of the present invention, including: a motor contained in a top cover; a vertical shaft that is rotationally driven by the motor, the vertical shaft being contained in an extension casing; and a propeller that is rotationally driven by the vertical shaft, the propeller being provided at a gear casing, wherein a heat exchanging member is provided that is positioned below an anticavitation plate and above a propeller shaft that rotationally drives the propeller, and inside the heat exchanging member, a cooling oil channel member is provided that cooling oil for cooling the motor flows through.

According to an aspect of the present invention, the heat exchanging member can be positioned under water at all times, and the heat exchanging member can be cooled with running water while a vessel is travelling using the outboard engine. Therefore, by forming oil channels in the heat exchanging member, the cooling oil flowing in the oil channels can be efficiently cooled. Moreover, by arranging the heat exchanging member above the propeller shaft, resistance in travelling can be reduced.

BRIEF DESCRIPTION OF THE DRAWINGS

FIG. 3 is an elevational sectional view of a motor portion;

DETAILED DESCRIPTION OF THE PREFERRED EMBODIMENTS

Hereafter, embodiments of the present invention will be described with reference to the drawings.

First Embodiment

Figure 1:
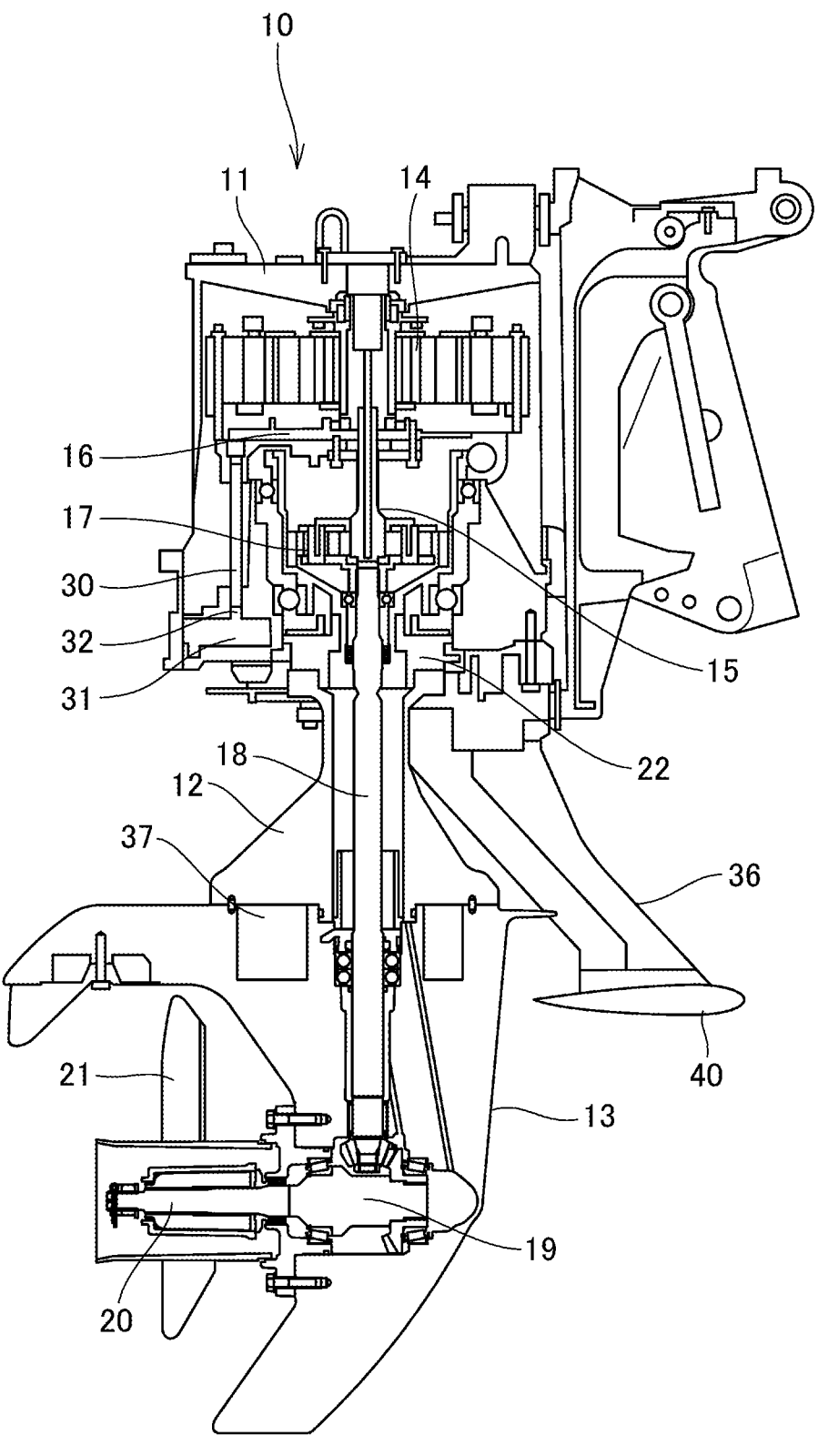
FIG. 1 is an elevational sectional view showing a first embodiment of an outboard engine according to the present invention.
Figure 2:
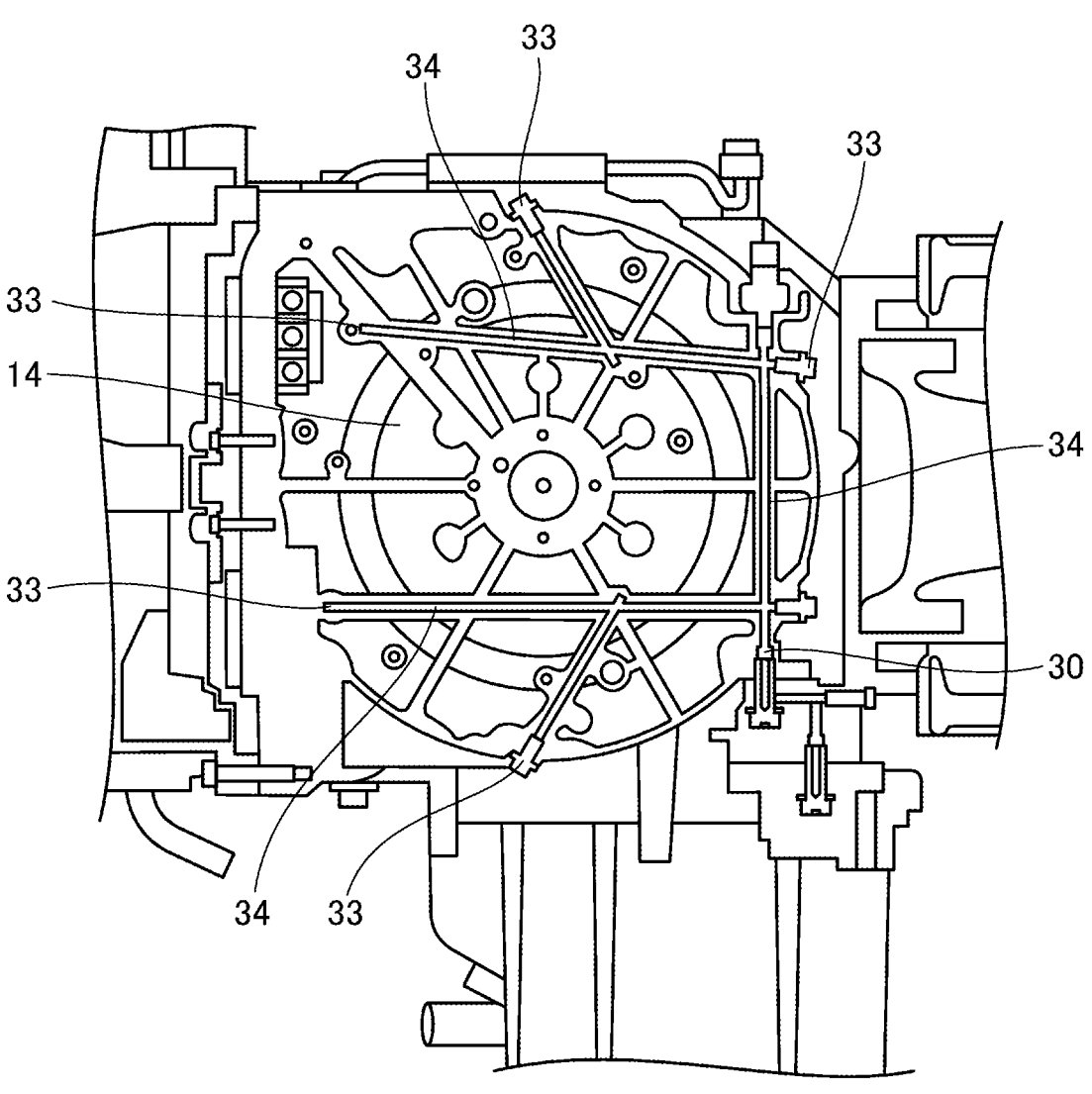
FIG. 2 is a transverse sectional view of a top cover portion of the outboard engine.
Figure 3:
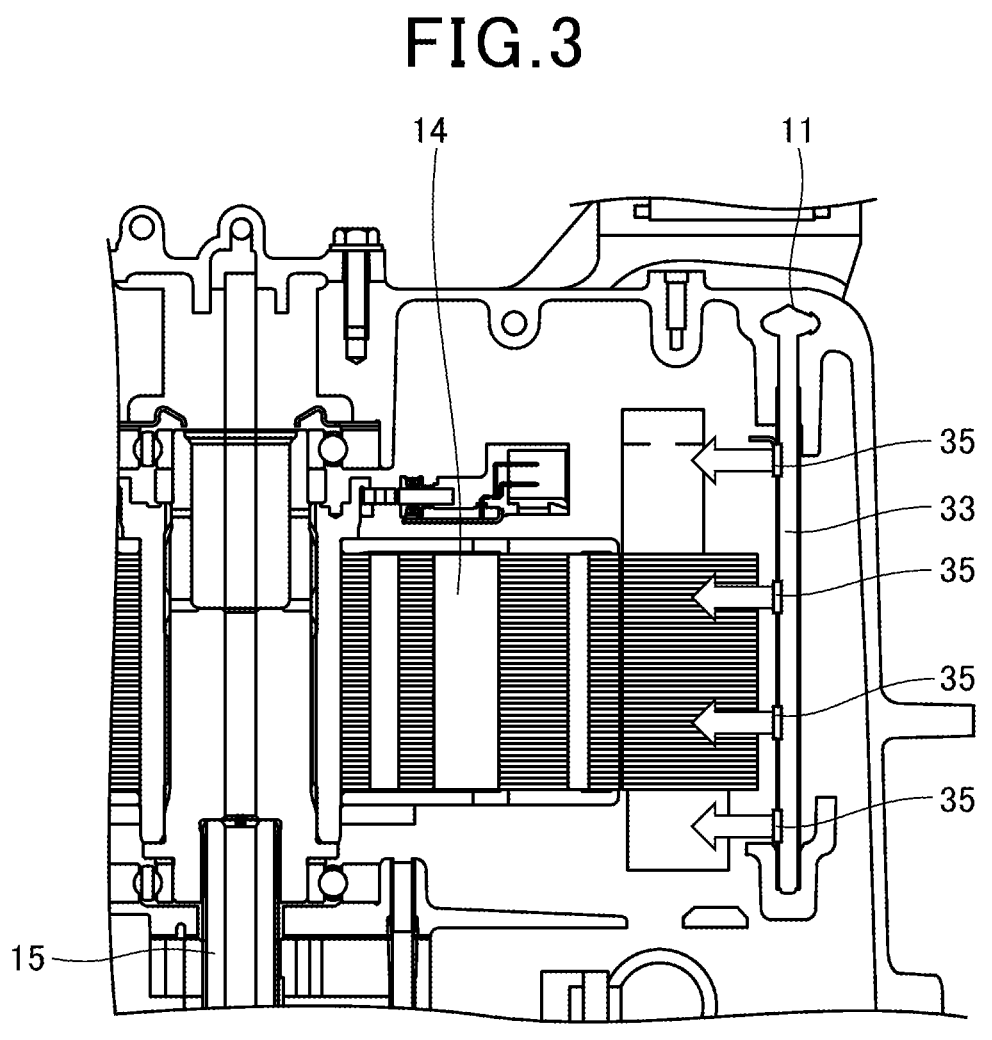
Figure 4:
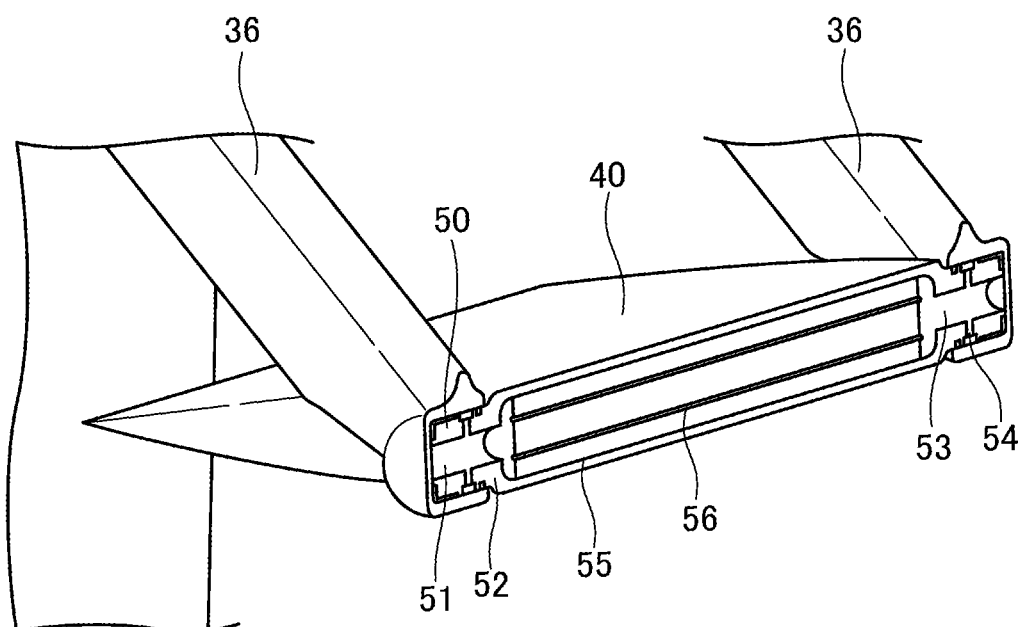
FIG. 4 is a perspective view having a cross section of a part of a heat exchanging member according to the first embodiment.
Figure 5:
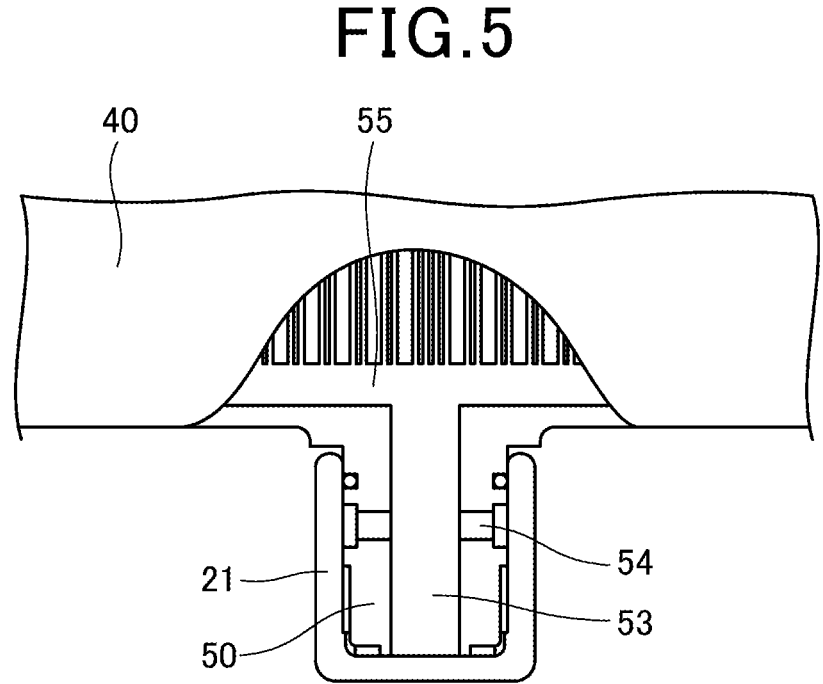
FIG. 5 is a sectional view of a pivot shaft portion of the heat exchanging member according to the first embodiment.
Figure 6:
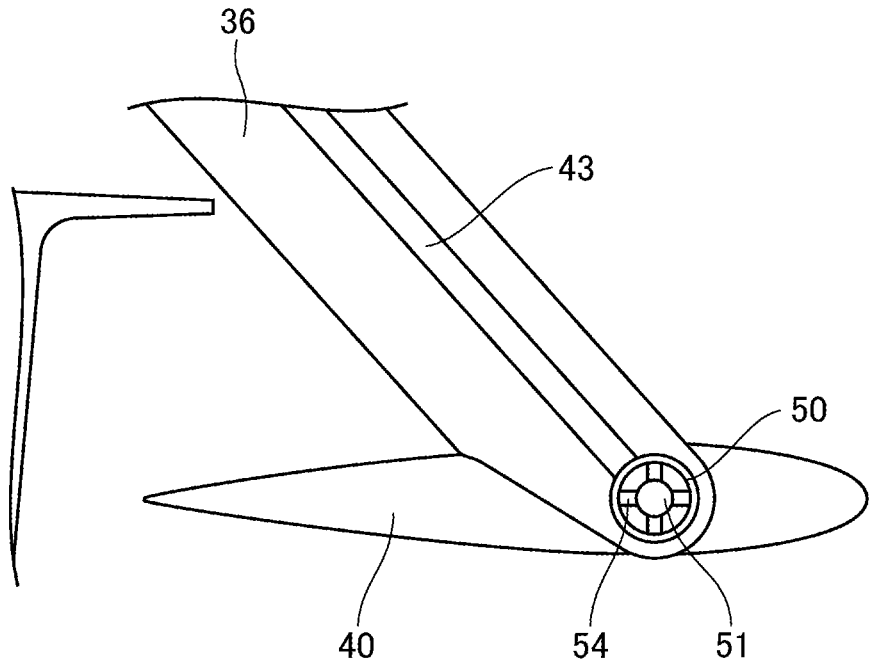
FIG. 6 is a sectional view of an arm member portion of the heat exchanging member according to the first embodiment.

FIG. 1 is an elevational sectional view showing an embodiment of an outboard engine. FIG. 2 is a transverse sectional view of a top cover portion of the outboard engine. FIG. 3 is an elevational sectional view of a motor portion. FIG. 4 is a perspective view having a cross section of a part of a heat exchanging member. FIG. 5 is a sectional view of a pivot shaft portion of the heat exchanging member. FIG. 6 is a sectional view of an arm member portion of the heat exchanging member.

An outboard engine 10 is attached to the stern of a hull.

As shown in FIG. 1, the outboard engine 10 includes a top cover 11, an extension casing 12, and a gear casing 13.

A motor 14 is contained inside the top cover 11. The motor 14 is positioned above water. The motor 14 is an electric motor rotationally driven by power supply from an accumulator such as a battery.

The motor 14 includes an output shaft 15 integrally driven by rotation of its rotor. The output shaft 15 extends in a substantially perpendicular direction, extending downward under the motor 14.

The lower surface of the top cover 11 is sealed against the extension casing 12, and the lower surface of the top cover 11 is formed as an oil pan 22.

An oil pump 16 driven by rotation of the output shaft 15 is provided on the output shaft 15 near the lower portion of the motor 14.

Planetary gears 17 for deceleration are provided on the output shaft 15 under the oil pump 16.

To the planetary gears 17, a vertical shaft 18 extending downward and passing through the inside of the extension casing 12 is connected.

The lower end part of the vertical shaft 18 is connected to a propeller shaft 20 via transmission gears 19 contained inside the gear casing 13.

A propeller 21 is attached to the tip part of the propeller shaft 20.

As shown in FIG. 1 and FIG. 2, an oil intake tube 30 extending in the up-down direction is provided inside the top cover 11. The lower end part of the oil intake tube 30 is arranged near the bottom part of the oil pan 22 so as to be immersed in cooling oil stored in the oil pan 22. An oil intake port 32 is provided on the oil intake tube 30 via a strainer 31.

As shown in FIG. 3, oil ejection tubes 33 extending in the up-down direction are provided on the outer peripheral part of the motor 14. A plurality of (in the present embodiment, six) oil ejection tubes 33 are provided in the circumferential direction of the motor 14.

To the upper end part of the oil intake tube 30, branch tubes 34 are connected that feed the cooling oil to the upper end parts of the oil ejection tubes 33.

Oil ejection ports 35 that eject the cooling oil are provided at positions, on the oil ejection tubes 33, corresponding to the outer circumferential surface of the motor 14. A plurality of oil ejection ports 35 are provided on each oil ejection tube 33 along the up-down direction.

The cooling oil after cooling the motor 14 is collected in a lower part of the motor 14 and fed to a heat exchanging member 40 via a cooling oil feeding pipe 43. Meanwhile, the cooling oil having been cooled in the heat exchanging member 40 is fed to the branch tubes 34 above via a cooling oil return pipe (not shown) and cools the motor 14, and after that, is returned to the oil pan 22.

To both sides on the lower surface of the oil pan 22, there are attached a pair of arm members 36 each extending frontward and obliquely downward as shown in FIG. 1.

Flow channels for the oil are formed inside the respective arm members 36. The cooling oil feeding pipe 43 is formed inside one of the arm members 36, and a cooling oil return pipe (not shown) is formed inside the other of the arm members 36.

Notably, since the cooling oil feeding pipe 43 and the cooling oil return pipe are configured to be in right-left asymmetry, a configuration on the side of the cooling oil feeding pipe 43 is hereafter mainly described.

The heat exchanging member 40 is attached to the lower end parts of the arm members 36.

The heat exchanging member 40 has a front end part that is formed to have a curved surface shape and a rear end part that is formed to have an acute angle, accordingly having a substantially wing-like sectional shape.

The heat exchanging member 40 is arranged in front of the gear casing 13 below an anticavitation plate 37 and above the propeller shaft 20 which rotationally drives the propeller 21, the anticavitation plate 37 being provided near the boundary between the extension casing 12 and the gear casing 13.

On both sides of the heat exchanging member 40, cylindrical pivot shafts 50 are provided that are freely pivotably engaged with the arm members 36.

The pivot shafts 50, of the heat exchanging member 40, with respect to the arm members 36 extend in a direction orthogonally intersecting the rotary axis of the propeller shaft 20 of the propeller 21, the pivot shafts 50 extending in the right-left direction of the outboard engine.

A cooling oil inflow-side channel 51 is formed inside the pivot shaft 50 engaged with the arm member 36 that the cooling oil feeding pipe 43 is contained in. On the pivot shaft 50, there are formed at a plurality of places in the circumferential direction of the pivot shaft 50 cooling oil inflow-side communication channels 52 that allow communication from the cooling oil inflow-side channel 51 to the outer circumferential surface of the pivot shaft 50.

A cooling oil outflow-side channel 53 is formed inside the pivot shaft 50 engaged with the arm member 36 that the cooling oil return pipe is formed in. On the pivot shaft 50, there are formed at a plurality of places in the circumferential direction cooling oil outflow-side communication channels 54 that allow communication from the cooling oil outflow-side channel 53 to the outer circumferential surface of the pivot shaft 50.

The cooling oil inflow-side channel 51 and the cooling oil outflow-side channel 53 communicate with the inside of the heat exchanging member 40.

A cooling oil channel member 55 is contained inside the heat exchanging member 40. The cooling oil channel member 55 is provided across the whole area inside the heat exchanging member 40, and in the cooling oil channel member 55, there are formed a plurality of cooling oil channels 56 that allow communication between the cooling oil inflow-side channel 51 and the cooling oil outflow-side channel 53.

This allows a configuration that the cooling oil fed from the cooling oil feeding pipe 43 flows through the cooling oil inflow-side communication channels 52, the cooling oil inflow-side channel 51, the cooling oil channels 56 of the cooling oil channel member 55, the cooling oil outflow-side channel 53, and the cooling oil outflow-side communication channels 54, fed to the branch tubes 34 above from the cooling oil return pipe to cool the motor 14, and after that, is returned to the oil pan 22.

Further, the heat exchanging member 40 is formed in front of the gear casing 13, and while the vessel is travelling using the outboard engine 10, running water is to touch the portion of the heat exchanging member 40 prior to touching the gear casing 13. Therefore, the cooling oil can be efficiently cooled through heat exchange between the running water and the cooling oil flowing in the outflow-side oil channels 46 of the heat exchanging member 40.

Next, operation of the present embodiment is described.

In the present embodiment, by driving the motor 14, a driving force of the motor 14 is transmitted to the propeller shaft 20 via the rotary shaft, the planetary gears 17 for deceleration, and the vertical shaft 18, and thereby, rotates the propeller 21 to advance or reverse the vessel.

Driving the motor 14 also leads to driving the oil pump 16 simultaneously.

When the oil pump 16 is driven, the cooling oil stored in the oil pan 22 is fed from the oil intake port 32 via the oil intake tube 30 and the strainer 31 toward the heat exchanging member 40 via the cooling oil feeding pipe 43.

The cooling oil fed from the cooling oil feeding pipe 43 is fed to the cooling oil channels 56 of the cooling oil channel member 55 via the cooling oil inflow-side communication channels 52 and the cooling oil inflow-side channel 51.

Further, since the heat exchanging member 40 is positioned under water and the heat exchanging member 40 is cooled, the cooling oil is efficiently cooled down to the temperature of the running water while flowing through the cooling oil channels 56.

After that, the cooling oil having been cooled flows through the cooling oil outflow-side channel 53 and the cooling oil outflow-side communication channels 54, is fed from the cooling oil return pipe to the oil ejection tubes 33 via the branch tubes 34, and is ejected to the outer circumferential surface of the motor 14 from the oil ejection ports 35.

Thereby, the outer circumference of the motor 14 is cooled with the cooling oil.

Moreover, the heat exchanging member 40 is attached freely pivotably with respect to the arm members 36.

Accordingly, even when an inclination arises on the outboard engine due to a pitch while the vessel is travelling, the heat exchanging member 40 can substantially hold its horizontality with resistance from the running water, and travelling resistance due to the heat exchanging member 40 can be reduced.

As mentioned above, there are included in the present embodiment: the motor 14 contained in the top cover 11; the vertical shaft 18 that is rotationally driven by the motor 14, the vertical shaft 18 being contained in the extension casing 12; and the propeller 21 that is rotationally driven by the vertical shaft 18, the propeller 21 being provided at the gear casing 13.

The heat exchanging member 40 is provided that is positioned below the anticavitation plate 37 and above the propeller shaft 20 that rotationally drives the propeller 21, and inside the heat exchanging member 40, the cooling oil channel member 55 is provided that the cooling oil for cooling the motor 14 flows through.

Accordingly, the heat exchanging member 40 can be positioned under water at all times, and the heat exchanging member 40 can be cooled with running water while the vessel is travelling using the outboard engine 10. Therefore, by forming the oil channels in the heat exchanging member 40, the cooling oil flowing in the oil channels can be efficiently cooled. Moreover, by arranging the heat exchanging member 40 above the propeller shaft 20, resistance in travelling can be reduced.

Moreover, in the present embodiment, the heat exchanging member 40 is arranged ahead of the gear casing 13.

Accordingly, the heat exchanging member 40 can be restrained from interfering with rotation of the propeller 21. Moreover, by arranging the heat exchanging member 40 ahead of the gear casing 13, cold running water is to touch the heat exchanging member 40 at all times, and the efficiency of cooling the cooling oil by the heat exchanging member 40 can be enhanced.

Moreover, in the present embodiment, the heat exchanging member 40 is attached via the arm members 36 joined to the oil pan 22 and extending obliquely downward.

Accordingly, the heat exchanging member 40 can be restrained from interfering with the propeller 21.

Moreover, in the present embodiment, the heat exchanging member 40 is attached freely pivotably with respect to the arm members 36.

Accordingly, even when an inclination arises on the outboard engine 10, the heat exchanging member 40 can substantially hold its horizontality, and travelling resistance due to the heat exchanging member 40 can be reduced.

Moreover, in the present embodiment, the pivot shafts 50, of the heat exchanging member 40, with respect to the arm members 36 extend in the direction orthogonally intersecting the rotary axis of the propeller 21.

Accordingly, change of water caused by a propulsive force of the propeller 21 can be handled.

Moreover, in the present embodiment, the pivot shafts 50 of the heat exchanging member 40 extend in the right-left direction.

Accordingly, an inclination in the pitch direction of the hull in accelerating and decelerating the vessel can be handled.

Next, a second embodiment of the present invention is described with reference to the drawings.

Second Embodiment

Figure 7:
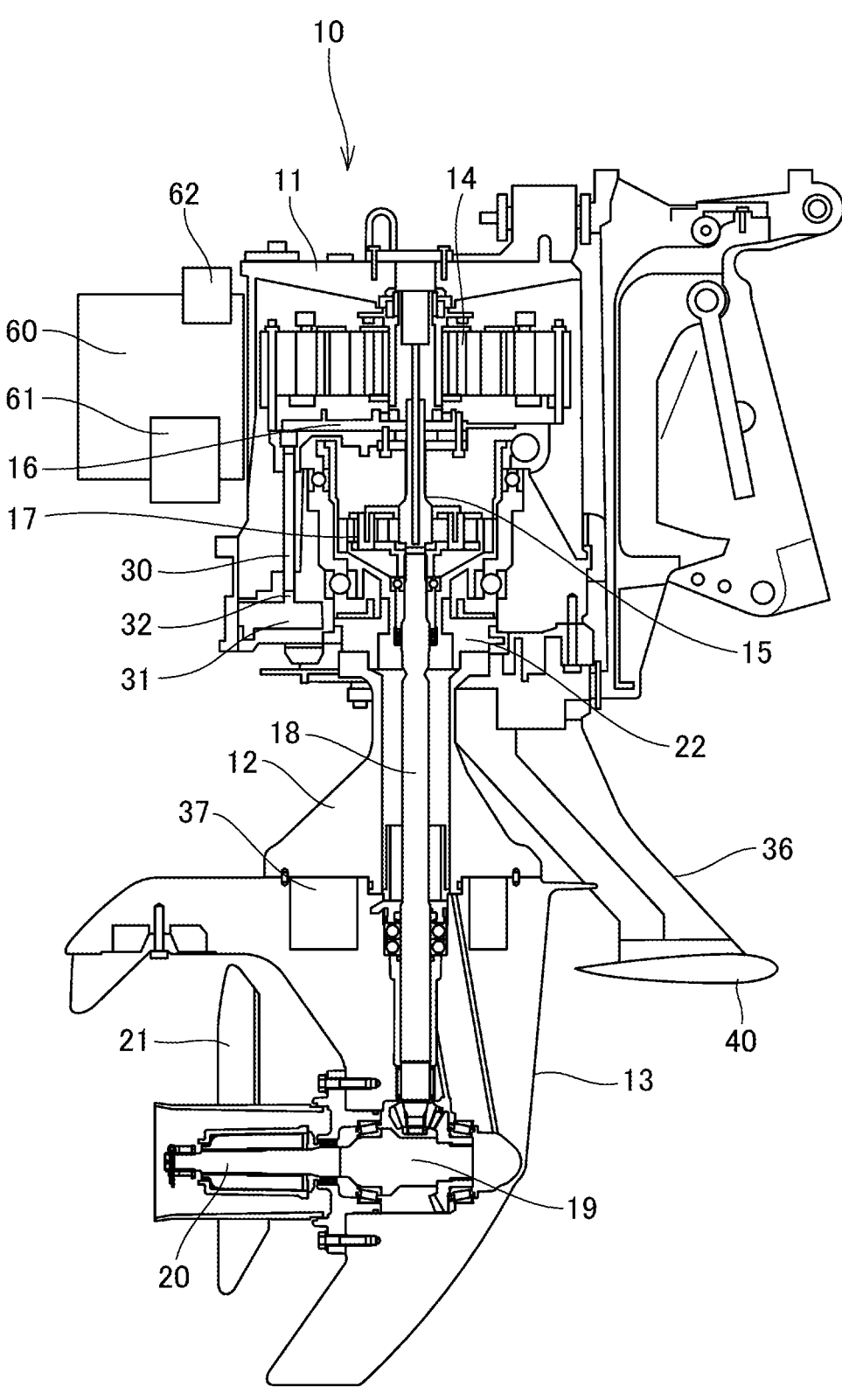
FIG. 7 is an elevational sectional view showing an outboard engine according to a second embodiment.

FIG. 7 is an elevational sectional view showing the second embodiment of the outboard engine.

In the present embodiment, the heat exchanging member 40 takes a configuration to collectively cool cooling oil for cooling the motor and cooling water for cooling a PCU (power control unit) (processor, circuit).

As shown in FIG. 7, a PCU casing 60 in which a PCU (not shown) for controlling the motor is contained is attached onto a lateral surface of the top cover 11. In the PCU casing 60, a cooling water channel (not shown) is formed through which cooling water as a coolant for cooling the PCU circulates.

To the PCU casing 60, a cooling water pump 61 is attached that feeds the cooling water to the cooling water channel. Moreover, to the PCU casing 60, a cooling water tank 62 is attached that stores extra cooling water.

A cooling water feeding pipe 63 (see FIG. 8) is connected to the cooling water pump 61. The cooling water feeding pipe 63 is connected to the heat exchanging member 40.

Moreover, a cooling water return pipe (not shown) connected to the heat exchanging member 40 is connected to the cooling water channel of the PCU casing 60.

Namely, by driving the cooling water pump 61, the cooling water flows sequentially through the cooling water feeding pipe 63, the heat exchanging member 40, the cooling water return pipe, the cooling water channel, and the cooling water tank 62.

Figure 8:
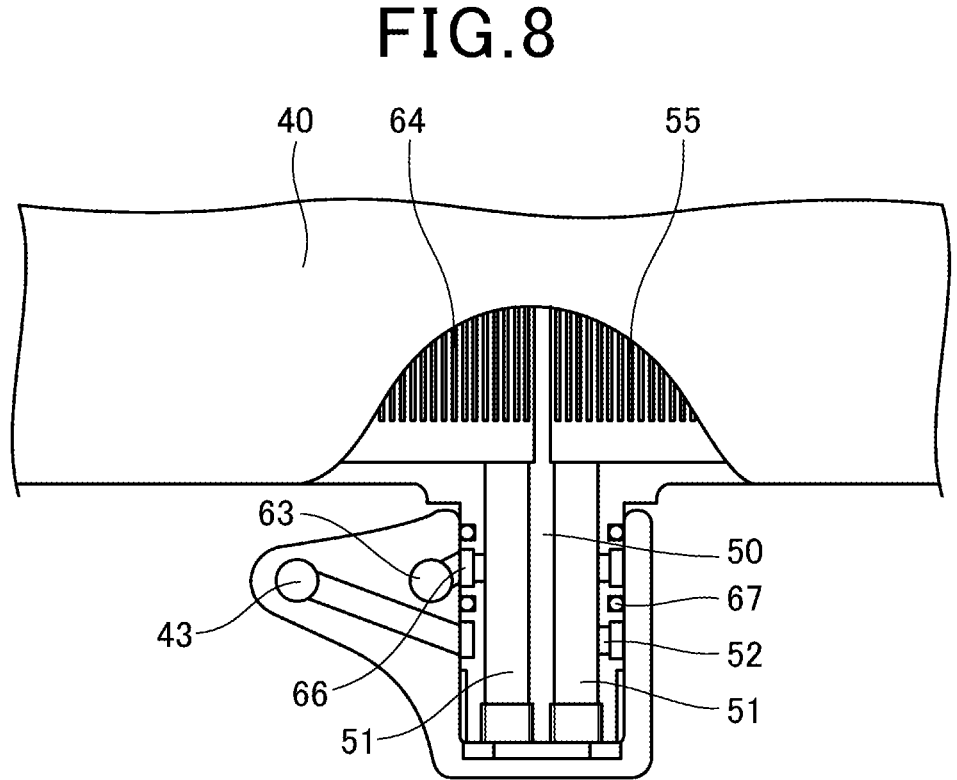
FIG. 8 is a sectional view of a pivot shaft portion of a heat exchanging member according to a second embodiment.

FIG. 8 is a sectional view of a rotary shaft portion of the heat exchanging member 40 of the second embodiment. Notably, while FIG. 8 shows only the inflow sides for the cooling oil and the cooling water, since the outflow sides for the cooling oil and the cooling water also have the similar configurations, only the inflow sides for the cooling oil and the cooling water are hereafter described.

As shown in FIG. 8, in the present embodiment, the cooling oil feeding pipe 43 and the cooling water feeding pipe 63 are contained inside one of the arm members 36.

The cooling oil channel member 55 and a cooling water channel member 64 are contained inside the heat exchanging member 40. In the present embodiment, the cooling oil channel member 55 is arranged in a front portion of the heat exchanging member 40, and the cooling water channel member 64 is arranged in a rear portion of the heat exchanging member 40.

The cooling oil inflow-side channel 51 connected to the cooling oil channel member 55 and a cooling water inflow-side channel 65 connected to the cooling water channel member 64 are formed inside the pivot shaft 50.

On the pivot shaft 50, there are formed the cooling oil inflow-side communication channels 52 that allow communication between the cooling oil feeding pipe 43 and the cooling oil inflow-side channel 51.

On the pivot shaft 50, there are formed cooling water inflow-side communication channels 66 that allow communication between the cooling water feeding pipe 63 and the cooling water inflow-side channel 65.

The cooling oil inflow-side communication channels 52 and the cooling water inflow-side communication channels 66 are formed at different positions in the axial direction of the pivot shaft 50, and a sealing member 67 such, for example, as an O-ring is provided for partition between the cooling oil inflow-side communication channels 52 and the cooling water inflow-side communication channels 66.

Next, operation of the present embodiment is described.

In the present embodiment, by driving the motor 14, the oil pump 16 is driven and the cooling water pump 61 is driven.

When the oil pump 16 is driven, the cooling oil stored in the oil pan 22 is fed toward the heat exchanging member 40 via the cooling oil feeding pipe 43.

Meanwhile, driving the cooling water pump 61 feeds the cooling water to the cooling water channel of the PCU casing 60 to cool the PCU casing 60. The cooling water after cooling is fed to the heat exchanging member 40 via the cooling water feeding pipe 63.

Then, since the heat exchanging member 40 is positioned under water and the heat exchanging member 40 is cooled, the cooling oil and the cooling water fed to the heat exchanging member 40 are efficiently cooled down to the temperature of the running water while flowing through the cooling oil channel member 55 and the cooling water channel member 64.

After that, the cooling oil having been cooled cools the motor 14 via the cooling oil return pipe, and after that, is returned to the oil pan 22.

The cooling water having been cooled is returned to the PCU casing 60 via the cooling water return pipe.

As mentioned above, in the present embodiment, inside the heat exchanging member 40, there are provided the cooling oil channel member 55 which the cooling oil flows through and the cooling water channel member 64 that the cooling water for cooling the PCU flows through.

Accordingly, one heat exchanging member 40 can cool the cooling oil for cooling the motor and the cooling water for cooling the PCU.

While the present invention has been described with the aforementioned embodiments, the present invention is not limited to the aforementioned embodiments but various alterations, substitutions, additions, and omissions may occur as needed.

CONFIGURATIONS SUPPORTED BY THE AFOREMENTIONED EMBODIMENTS

The aforementioned embodiments support the following configurations.
(Configuration 1)
An outboard engine comprising: a motor contained in a top cover; a vertical shaft that is rotationally driven by the motor, the vertical shaft being contained in an extension casing; and a propeller that is rotationally driven by the vertical shaft, the propeller being provided at a gear casing, wherein a heat exchanging member is provided that is positioned below an anticavitation plate and above a propeller shaft that rotationally drives the propeller, and inside the heat exchanging member, a cooling oil channel member is provided that cooling oil for cooling the motor flows through.

According to this configuration, the heat exchanging member can be positioned under water at all times, and the heat exchanging member can be cooled with running water while a vessel is travelling using the outboard engine. Therefore, by forming oil channels in the heat exchanging member, the cooling oil flowing in the oil channels can be efficiently cooled. Moreover, by arranging the heat exchanging member above the propeller shaft, resistance in travelling can be reduced.
(Configuration 2)
The outboard engine according to Configuration 1, wherein the heat exchanging member is arranged ahead of the gear casing.

According to this configuration, the heat exchanging member can be restrained from interfering with rotation of the propeller. Moreover, arranging the heat exchanging member ahead of the gear casing, cold running water is to touch the heat exchanging member at all times, and the efficiency of cooling the cooling oil by the heat exchanging member can be enhanced.

(Configuration 3)
The outboard engine according to Configuration 1 or Configuration 2, wherein the heat exchanging member is attached via an arm member joined to an oil pan and extending obliquely downward.

According to this configuration, the heat exchanging member can be restrained from interfering with the propeller.
(Configuration 4)
The outboard engine according to Configuration 3, wherein the heat exchanging member is attached freely pivotably with respect to the arm member.

According to this configuration, even when an inclination arises on the outboard engine, the heat exchanging member can substantially hold its horizontality, and travelling resistance due to the heat exchanging member can be reduced.
(Configuration 5)
The outboard engine according to Configuration 4, wherein a pivot shaft, of the heat exchanging member, with respect to the arm member extends in a direction orthogonally intersecting a rotary axis of the propeller.

According to this configuration, change of water caused by a propulsive force from the propeller can be handled.
(Configuration 6)
The outboard engine according to Configuration 5, wherein the pivot shaft of the heat exchanging member extends in a right-left direction.

According to this configuration, an inclination in the pitch direction of a hull in accelerating and decelerating the vessel can be handled.
(Configuration 7)
The outboard engine according to any one of Configuration 1 to Configuration 6, including a PCU, wherein inside the heat exchanging member, the cooling oil channel member which the cooling oil flows through, and a cooling water channel member that cooling water for cooling the PCU flows through are provided.

According to this configuration, one heat exchanging member can cool the cooling oil for cooling the motor and the cooling water for cooling the PCU.

REFERENCE SIGNS LIST

10 Outboard engine
11 Top cover
12 Extension casing
13 Gear casing
14 Motor
15 Output shaft
16 Oil pump
18 Vertical shaft
19 Transmission gear
21 Propeller
22 Oil pan
30 Oil intake tube
32 Oil intake port
33 Oil ejection tube
34 Branch tube
35 Oil ejection port
36 Arm member
37 Anticavitation plate
40 Heat exchanging member
42 Inflow-side oil channel
43 Cooling oil feeding pipe
46 Outflow-side oil channel
50 Pivot shaft
51 Cooling oil inflow-side channel 52 Cooling oil inflow-side communication channel
53 Cooling oil outflow-side channel
54 Cooling oil outflow-side communication channel
55 Cooling oil channel member
56 Cooling oil channel
60 PCU casing
61 Cooling water pump
62 Cooling water tank
63 Cooling water feeding pipe
64 Cooling water channel member
65 Cooling water inflow-side channel
66 Cooling water inflow-side communication channel
67 Sealing member

What is claimed is:

1. An outboard engine comprising:
a motor contained in a top cover;
a vertical shaft that is rotationally driven by the motor, the vertical shaft being contained in an extension casing; and
a propeller that is rotationally driven by the vertical shaft, the propeller being provided at a gear casing; and
a PCU (Power Control Unit), wherein
a heat exchanging member is provided that is positioned below an anticavitation plate and above a propeller shaft that rotationally drives the propeller,
a cooling oil channel member is provided inside the heat exchanging member, cooling oil flowing through the cooling oil channel member to cool the motor, and
a cooling water channel member is provided inside the heat exchanging member, cooling water flowing through the cooling water channel member to cool the PCU.

2. The outboard engine according to claim 1, wherein the heat exchanging member is arranged more frontward than the gear casing.

3. The outboard engine according to claim 1, wherein the heat exchanging member is attached via an arm member joined to an oil pan and extending obliquely downward.

4. The outboard engine according to claim 3, wherein the heat exchanging member is attached freely pivotably with respect to the arm member.

5. The outboard engine according to claim 4, wherein a pivot shaft, of the heat exchanging member, with respect to the arm member extends in a direction orthogonally intersecting a rotation axis of the propeller.

6. The outboard engine according to claim 5, wherein the pivot shaft of the heat exchanging member extends in a right-left direction.

7. An outboard engine comprising:
a motor contained in a top cover;
a vertical shaft that is rotationally driven by the motor, the vertical shaft being contained in an extension casing; and
a propeller that is rotationally driven by the vertical shaft, the propeller being provided at a gear casing, wherein
a heat exchanging member is provided that is positioned below an anticavitation plate and above a propeller shaft that rotationally drives the propeller,
a cooling oil channel member is provided inside the heat exchanging member, cooling oil flowing through the cooling oil channel member to cool the motor, and
the heat exchanging member is attached via an arm member joined to an oil pan and extending obliquely downward.

8. The outboard engine according to claim 7, wherein a flow channel for the cooling oil is formed inside the arm member.

9. The outboard engine according to claim 7, wherein the arm member comprises a pair of arm members, and
the heat exchanging member is attached to the pair of arm members.

10. The outboard engine according to claim 9, wherein
a cooling oil feeding pipe through which the cooling oil flows is formed inside one arm member among the pair of arm members, and
a cooling oil return pipe through which the cooling oil flows is formed inside an other arm member among the pair of arm members.

11. The outboard engine according to claim 10, wherein a pair of pivot shafts are provided on both sides of the heat exchanging member, the pair of pivot shafts are freely pivotably engaged with the pair of arm members, respectively.

12. The outboard engine according to claim 11, wherein
a cooling oil inflow-side channel through which the cooling oil flows is formed inside one pivot shaft that is among the pair of pivot shafts and that is engaged with the one arm member, and
a cooling oil outflow-side channel through which the cooling oil flows is formed inside an other pivot shaft that is among the pair of pivot shafts and that is engaged with the other arm member.

13. The outboard engine according to claim 12, wherein cooling oil inflow-side communication channels that allow communication from the cooling oil inflow-side channel to an outer circumferential surface of the one pivot shaft are formed to the one pivot shaft.

14. The outboard engine according to claim 13, wherein cooling oil outflow-side communication channels that allow communication from the cooling oil outflow-side channel to an outer circumferential surface of the other pivot shaft are formed to the other pivot shaft.

15. The outboard engine according to claim 7, wherein the arm member comprises a pair of arm members,
the heat exchanging member is attached to the pair of arm members, and
a cooling oil feeding pipe through which the cooling oil flows and a cooling water feeding pipe through which a cooling water flows are contained inside one arm member among the pair of arm members.

16. The outboard engine according to claim 15, wherein a pair of pivot shafts are provided on both sides of the heat exchanging member, the pair of pivot shafts are freely pivotably engaged with the pair of arm members, respectively, and
a cooling oil inflow-side channel connected to the cooling oil channel member and a cooling water inflow-side channel connected to a cooling water channel member are formed inside one pivot shaft that is among the pair of pivot shafts and that is engaged with the one arm member.

17. The outboard engine according to claim 16, wherein cooling oil inflow-side communication channels that allow communication from the cooling oil inflow-side channel to an outer circumferential surface of the one pivot shaft are formed to the one pivot shaft,
cooling water inflow-side communication channels that allow communication between the cooling water feeding pipe and the cooling water inflow-side channel are formed to the one pivot shaft, and
the cooling oil inflow-side communication channels and the cooling water inflow-side communication channels are formed at different positions in an axial direction of the one pivot shaft.

18. An outboard engine comprising:

a motor contained in a top cover;

a vertical shaft that is rotationally driven by the motor, the vertical shaft being contained in an extension casing; and a propeller that is rotationally driven by the vertical shaft, the propeller being provided at a gear casing, wherein a heat exchanging member is provided that is positioned below an anticavitation plate and above a propeller shaft that rotationally drives the propeller, a cooling oil channel member is provided inside the heat exchanging member, cooling oil flowing through the cooling oil channel member to cool the motor, and the heat exchanging member is arranged more frontward than the gear casing and spaced apart from the gear casing.

\*   \*   \*   \*   \*